United States Patent [19]

Kantner et al.

[11] Patent Number: 5,019,541

[45] Date of Patent: May 28, 1991

[54] METHOD FOR PRODUCING SELF-SUPPORTING CERAMIC BODIES WITH ALTERED MICROSTRUCTURES

[75] Inventors: Robert C. Kantner, Newark, Del.; Michael K. Aghajanian, Bel Air; Stanislav Antolin, Elkton, both of Md.; Alan S. Nagelberg; Ratnesh K. Dwivedi, both of Wilmington, Del.

[73] Assignee: Lanxide Technology Company, LP, Newark, Del.

[21] Appl. No.: 547,404

[22] Filed: Jul. 2, 1990

Related U.S. Application Data

[63] Continuation of Ser. No. 168,798, Mar. 16, 1988, abandoned, which is a continuation-in-part of Ser. No. 908,453, Sep. 17, 1986, abandoned.

[51] Int. Cl.$^5$ ............................................. C04B 35/10
[52] U.S. Cl. .................................. 501/127; 501/119; 501/128; 264/65
[58] Field of Search ...................... 501/87, 88, 94, 96, 501/98, 92, 119, 127, 128, 134; 423/345, 412, 618, 625, 411; 264/65; 75/235

[56] References Cited

U.S. PATENT DOCUMENTS

| | | |
|---|---|---|
| 2,741,822 | 4/1956 | Udy . |
| 3,255,027 | 1/1966 | Talsma . |
| 3,296,002 | 1/1967 | Hare . |
| 3,298,842 | 1/1967 | Seufert . |
| 3,419,404 | 12/1968 | Mao . |
| 3,421,863 | 1/1969 | Bawa . |
| 3,437,468 | 4/1967 | Seufert . |
| 3,473,938 | 10/1969 | Oberlin . |
| 3,473,987 | 10/1969 | Sowards . |
| 3,789,096 | 1/1974 | Church . |
| 3,864,154 | 2/1975 | Gazza et al. . |
| 3,973,977 | 8/1976 | Wilson . |
| 4,713,360 | 12/1957 | Newkirk et al. ................ 501/134 X |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |

OTHER PUBLICATIONS

"Oxidation of Molten Aluminum Alloys, Reaction with Refractories"—M. Drouzy and M. Richard—Mar. 1974—Fonderie, France No. 332 pp. 121–128.

"Refractories for Aluminum Alloy Melting Furnaces'-'—B. Clavaud and V. Jost—Sep. 1980—Lillian Brassinga (from French) Jan. 1985.

*Primary Examiner*—Karl Group
*Attorney, Agent, or Firm*—Mark G. Mortenson; Carol A. Lewis; Michael K. Boyer

[57] ABSTRACT

This invention relates to a method for producing a self-supporting ceramic structure comprising an oxidation reaction product of a parent metal and a vapor-phase oxidant characterized by an altered microstructure attributable to the addition of one or more process modifiers relative to substantially the same oxidation reaction product produced without a process modifier.

18 Claims, 9 Drawing Sheets

METHOD FOR PRODUCING SELF-SUPPORTING CERAMIC BODIES WITH ALTERED MICROSTRUCTURES

CROSS-REFERENCE TO RELATED APPLICATION

This is a continuation of copending application Ser. No. 07/168,798 filed on Mar. 16, 1988, now abandoned which is a continuation-in-part of Commonly Owned and Copending U.S. patent application Ser. No. 908,453, filed Sept. 17, 1986, now abandoned in the name of Robert C. Kantner, et al and entitled "Method for Producing Self-Supporting Ceramic Bodies with Refined Microstructures".

FIELD OF THE INVENTION

This invention relates to a method for producing self-supporting ceramic bodies, formed as the oxidation reaction product of a parent metal (e.g., aluminum) and a vapor-phase oxidant containing oxygen, and having an altered microstructure attributable to the addition of one or more transition metal process modifiers. This invention also relates to ceramic bodies produced thereby.

BACKGROUND OF THE INVENTION AND COMMONLY OWNED PATENT APPLICATIONS

In recent years, there has been an increasing interest in the use of ceramics for structural applications historically served by metals. The impetus for this interest has been the superiority of ceramics with respect to certain properties, such as corrosion resistance, hardness, modulus of elasticity, and refractory capabilities, when compared with metals.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which incorporates one or more diverse kinds of filler materials such as particulates, fibers, rods, and the like.

There are several known limitations or difficulties in substituting ceramics for metals, such as scaling versatility, capability to produce complex shapes, satisfying the properties required for the end use application, and costs. Several copending patent applications and one Patent, all assigned to the same owner as this application (hereinafter referred to as Commonly Owned Patent Applications and Patent), overcome these limitations or difficulties and provide novel methods for reliably producing ceramic materials, including composites. The method is disclosed generically in commonly owned U.S. Pat. No. 4,713,360, which issued on Dec. 15, 1987 from U S. application Ser. No. 818,943, filed Jan. 15, 1986, which is a continuation-in-part of Ser. No. 776,964, filed Sept. 17, 1985, which is a continuation-in-part of Ser. No. 705,787, filed Feb. 26, 1985 which is a continuation-in-part of U.S. application Ser. No. 591.392, filed Mar. 16, 1984, all in the names of Marc S. Newkirk et at and entitled "Novel Ceramic Materials and Methods for Making the Same". These applications disclose the method of producing self-supporting ceramic bodies grown as the oxidation reaction product from a parent metal. Molten metal is reacted with a vapor-phase oxidant to form an oxidation reaction product, and the metal migrates through the oxidation reaction product toward the oxidant thereby continuously developing a ceramic polycrystalline body which can be produced having an interconnected metallic component. The process may be enhanced by the use of an alloyed dopant, such as is used in the case of oxidizing aluminum doped with magnesium and silicon in air to form alpha-alumina ceramic structures. This method was improved upon by the application of dopant materials to the surface of the precursor metal, as described in commonly owned U.S. Pat. No. 4,853,352, which issued Aug. 1, 1989, from U.S. application Ser. No. 220,935, filed June 23, 1988, and entitled "Method of Making Self-Supporting Ceramic Materials and Materials made Thereby", in the names of Newkirk et al., which was a continuation application of U.S. patent application Ser. Mo 822,999, filed Jan. 27, 1986, which is a continuation-in-part of Ser. No. 778,985, filed Sept. 17, 1985, which is a continuation in-part of Ser. No. 747,788, filed June 25, 1985, which is a continuation-in-part of Ser. No. 632,636, filed July 20, 1984, all in the names of Marc S. Newkirk et al and entitled "Methods of Making Self Supporting Ceramic Materials".

This oxidation phenomenon was utilized in producing ceramic composite bodies as described in commonly owned U.S. Pat. No. 4,851,375, which issued July 25, 1989, as "Methods of Making Composite Ceramic Articles Having Embedded Filler", in the names of Marc S. Newkirk et al., which issued from U.S. patent application Ser. No. 819,397, filed Jan. 17, 1986 which is a continuation-in-part of Ser. No. 697,876, filed Feb. 4, 1985, both in the names of Marc S. Newkirk el at and entitled "Composite Ceramic Articles and Methods of Making Same". This Patent discloses novel methods for producing a self-supporting ceramic composite by growing an oxidation reaction product from a parent metal into a permeable mass of filler, thereby infiltrating the filler with a ceramic matrix. The resulting composite, however, has no defined predetermined geometry, shape, or configuration.

A method for producing ceramic composite bodies having a predetermined geometry or shape is disclosed in the commonly owned and copending U.S. application Ser. No. 338,471, filed Apr. 14, 1989, which is a continuation application of U.S. Pat. application Ser. No. 861,025, filed May 8, 1986, both in the names of Marc S. Newkirk et al and entitled "Shaped Ceramic Composites and Methods of Making the same". In accordance with the method in these U.S. patent applications, the developing oxidation reaction product infiltrates a permeable preform in the direction towards a defined surface boundary. It was discovered that high fidelity is more readily achieved by providing the preform with a barrier means, as disclosed in commonly owned and copending U.S. patent application Ser. No. 861,024, now allowed filed May 8, 1986, in the names of Marc S. Newkirk et al and entitled "Method of Making Shaped Ceramic Composites With the Use of a Barrier". This method produces shaped self-supporting ceramic bodies, including shaped ceramic composites, by growing the oxidation reaction product of a parent metal to a barrier means spaced from the metal for establishing a boundary or surface ceramic composites having a cavity with an interior geometry inversely replicating the shape of a positive mold or pattern is disclosed in commonly owned U.S. Pat. No. 4,828,785, which issued on May 9, 1989, from U.S. patent application Ser. No 823,542, filed Jan. 27, 1986, in the names of Marc S. Newkirk et at and entitled "inverse Shape Replication Method of Making Ceramic Article and Articles Obtained Thereby", and in U.S. Pat. No. 4,859,640, which issued Aug. 22, 1989, from U.S. patent application Ser. No. 896,157, filed Aug. 13, 1986 in the name of Marc S. Newkirk and entitled "Method of Making Ceramic Composite Articles With Shape Replicated Surfaces and Articles Obtained Thereby".

The aforementioned Commonly Owned Patent Applications and Patents, incorporated herein by reference, disclose methods for producing ceramic articles which overcome some of the traditional limitations or difficulties in producing ceramic articles as substitutes for metals in end-use applications.

Common to each of these Commonly Owned Patent Applications and Patents is the disclosure of embodiments of a ceramic body comprising an oxidation reaction product interconnected in one or more dimensions (usually in three dimensions) and one or more metallic constituents or components. The volume of metal, which typically includes non-oxidized constituents of the parent metal and/or metal reduced from an oxidant, dopant or filler, depends on such factors as the temperature at which the oxidation reaction product is formed, the length of time at which the oxidation reaction is allowed to proceed, the composition of the parent metal, the presence of dopant materials, the presence of reduced constituents of any oxidant or fitter materials, etc. Although some of the metallic components may be isolated or enclosed, it is frequently the case that a substantial volume percent of metal will be interconnected and accessible from an external surface of the ceramic body. It has been observed for these ceramic bodies that this interconnected metal-containing component or constituent can range from about 1 to about 40 percent by volume, and sometimes higher. Such a metallic component can impart certain favorable properties to, or improve the performance of, the ceramic articles in many product applications. For example, the presence of metal in the ceramic structure may have a substantial benefit with respect to imparting fracture toughness, thermal conductivity, or electrical conductivity to the ceramic body.

The present invention discloses a method for fabricating a ceramic or ceramic composite body, with the addition of a process modifier, exhibiting a microstructural alteration as compared to substantially the same ceramic or ceramic composite body fabricated without a modifier. An altered microstructure may improve or contribute to one or more properties of the resulting ceramic product.

The entire disclosures of all of the foregoing Commonly Owned Patent Applications and Patents are expressly incorporated herein by reference.

DEFINITIONS

As used hereinafter in the specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents, most typically within a range of from about 1–40% by volume, but may include still more metal.

"Oxidation reaction product" means one or more metals in any oxidized slate wherein the metal(s) has given up electrons to or shared electrons with another element, compound, or combination thereof. Accordingly, an "oxidation reaction product" under this definition includes the product of reaction of one or more metals with an oxidant such as oxygen, nitrogen, a halogen, sulphur, phosphorus, arsenic, carbon, boron, selenium, tellurium, and compounds and combinations thereof, for example, $SiO_2$ (as a source of oxygen), a boride reducible by the parent metal (as a source of boron), methane, ethane, propane, acetylene, ethylene, propylene (the hydrocarbon as a source of carbon), and mixtures such as air, $H_2/H_2O$ and $CO/CO_2$, the latter two (i.e., $H_2/H_2O$ and $CO/CO_2$) being useful in reducing the oxygen activity of the environment.

"Vapor phase oxidant", which identifies the oxidation as involving a particular gas or vapor, means an oxidant in which the identified gas or vapor is the sole, predominant or at least a significant oxidizer of the parent metal under the conditions obtained in the oxidizing environment utilized. For example, although the major constituent of air is nitrogen, the oxygen content of air is the sole oxidizer for the parent metal because oxygen is a significantly stronger oxidant than nitrogen Air therefore falls within the definition of an "oxygen-containing gas" oxidant but not within the definition of a "nitrogen-containing gas" oxidant as those terms are used herein and in the claims.

"Parent metal" refers to that metal, e.g. aluminum, which is the precursor for the polycrystalline oxidation reaction product, and includes that metal as a relatively pure metal, a commercially available metal with impurities and/or alloying constituents, or an alloy in which that metal is the major constituent; and when a specified metal is mentioned as the parent metal, e.g. aluminum, the metal identified should be read with this definition in mind unless indicated otherwise by the context.

SUMMARY OF THE INVENTION

The present invention provides a method for producing a self-supporting ceramic or ceramic composite body by the oxidation reaction of a molten parent metal (e.g., aluminum) with a vapor-phase oxidant containing oxygen, and includes employing a process modifier in conjunction or in combination with the parent metal. A process modifier is used along with the parent metal prior to oxidation of at least a portion of the parent metal. By reason of the presence of this modifier, the oxidation reaction product (e.g., alumina) formed exhibits a microstructural alteration (as discussed below in greater detail and shown in the attached Photomicrographs) relative to substantially the same oxidation reaction product produced without the modifier by substantially the same process. The resulting self-supporting ceramic body comprises the oxidation reaction product of the parent metal and vapor-phase oxidant and, optionally, non-oxidized metallic constituents.

Generally, in accordance with the present invention, a process modifier (discussed below in greater detail) is used in conjunction with the parent metal (e.g., aluminum). The parent metal is heated in the presence of an oxygen-containing oxidant to a temperature above its melting point, but below the melting point of the oxidation reaction product, to form a body of molten metal. At that temperature, or within that temperature range, the molten parent metal is reacted with the vapor-phase oxidant to form an oxidation reaction product (e.g., alumina), which product is maintained at least partially in contact with, and extends between, the body of molten parent metal and the vapor-phase oxidant. At this temperature, molten parent metal is transported through the oxidation reaction product towards the vapor-phase oxidant. As the molten parent metal contacts the vapor-phase at the interface between previously formed oxidation reaction product and vapor-phase oxidant, it is oxidized, thereby continuously developing a polycrystalline oxidation reaction product. The oxidation reaction is continued for a time sufficient to form a self-supporting ceramic body comprising the oxidation reaction product and, optionally, non-oxidized metallic constituents. By reason of the process of this invention, the microstructure of the ceramic product, comprising a matrix of the polycrystalline oxidation reaction product and metallic constituents or voids or both, exhibits a microstructural alteration (discussed below in greater detail).

The modifier may be provided for use with the parent metal by any one of several means, or a combination of means. The modifier may be (1) alloyed with the parent metal in a pre-process step, which is intended to include employing commercially available parent metal alloys having a suitable quantity of a desired modifier included in their composition, (2) may be applied onto or contacted with one or more surfaces of the parent metal, preferably the growth surface, or (3) in cases wherein a ceramic composite body is formed, the modifier may be admixed with the filler or preform material. Any of these means, singly or in combination, is disclosed generally as using the modifier in conjunction with the parent metal.

In accordance with one embodiment of the present invention, a suitable quantity of the modifier is provided for use in conjunction with the parent metal by pre-process alloying with the parent metal. Pre-process alloying of a modifier is intended to include employing a commercially available parent metal alloy which has a suitable quantity of the particular modifier intrinsically present in its alloy composition. The oxidation of the parent metal is carried out and the resulting ceramic product exhibits an altered microstructure.

In another embodiment, wherein a ceramic composite body is formed, and the oxidation reaction product is grown into a mass of filler material or a shaped preform, the process modifier may be provided by admixing it with the filler or preform material, or may be applied to one or more of its surfaces, preferably the surface contacting the parent metal. As the oxidation reaction product infiltrates the filler material, and thus the molten parent metal is transported through the developing oxidation reaction product, the molten parent metal contacts, and is thus conjoined with, the modifier typically as an alloy or intermetallic. The resulting ceramic product exhibits an altered microstructure.

In still another embodiment, the modifier is provided in the form of a compound or mixture which reacts with the molten parent metal, and/or dissociates under process conditions, to liberate the modifier which is then conjoined with the parent metal. Such a compound, for example, may be a metal oxide which is reducible by the molten parent metal. This compound may be applied in a layer on top of the parent metal body, or admixed with or applied to a filler or preform material.

BRIEF DESCRIPTION OF THE DRAWINGS

FIG. 1 is a photomicrograph at $1000\times$ magnification of the microstructure of an unmodified oxidation reaction product corresponding to Sample A, employing a parent metal alloy comprising 5 weight percent Si, 3 weight percent Mg as alloyed dopants, and a remainder being aluminum and air as the vapor-phase oxidant. FIG. 1A being a photomicrograph taken parallel to the growth direction (i.e., growth of the alloy occurred in a plane perpendicular to the plane of the page)

FIG. 2 is a photomicrograph at $1000\times$ magnification of the microstructure of an oxidation reaction product corresponding to Sample B, which has been modified by adding to the parent metal of FIG. 1, 2.8 weight percent Ti, FIG. 2A being a photomicrograph taken parallel to the growth direction (i.e., growth of the alloy occurred in a plane perpendicular to the plane of the page)

FIG. 3 is a photomicrograph at $1000\times$ magnification of the microstructure of an oxidation reaction product corresponding to Sample C, which has been modified by adding to a parent metal of 3 weight percent Si, 3 weight percent Mg, and a remainder being aluminum, 3 weight percent Zr, FIG. 3A being a photomicrograph taken parallel to the growth direction (i.e., growth of the alloy occurred in a plane perpendicular to the plane of the page)

FIG. 4 is a photomicrograph at $1000\times$ magnification of the microstructure of an oxidation reaction product corresponding to Sample D, which has been modified by adding to the parent metal of FIG. 1, 4.7 weight percent Cr, FIG. 4A being a photomicrograph taken parallel to the growth direction (i.e., growth of the alloy occurred in a plane perpendicular to the plane of the page)

FIG. 5 is a photomicrograph at $1000\times$ magnification of the microstructure of an oxidation reaction product corresponding to Sample E, which has been modified by adding to the parent metal of FIG. 1, 5.3 weight percent Co, FIG. 5A being a photomicrograph taken parallel to the growth direction (i.e., growth of the alloy occurred in a plane perpendicular to the plane of the page)

FIG. 6 is a photomicrograph at $1000\times$ magnification of the microstructure of an oxidation reaction product corresponding to Sample F, which has been modified by adding to the parent metal of FIG. 1, 2 weight percent Fe, FIG. 6A being a photomicrograph taken parallel to the growth direction (i.e., growth of the alloy occurred in a plane perpendicular to the plane of the page)

FIG. 7 is a photomicrograph of 1000× magnification of the microstructure of an oxidation reaction product corresponding to Sample G, which has been modified by adding to the parent metal of FIG. 1, 5.6 weight percent Cu, FIG. 7A being a photomicrograph taken parallel to the growth direction (i.e., growth of the alloy occurred in a plane perpendicular to the plane of the page)

FIG. 8 is a photomicrograph at 1000× magnification of the microstructure of an oxidation reaction product corresponding to Sample H, which has been modified by adding to the parent metal of FIG. 1, 2 weight percent Ni, FIG. 8A being a photomicrograph taken parallel to the growth direction (i.e., growth of the alloy occurred in a plane perpendicular to the plane of the page)

FIG. 9 is a photomicrograph at 1000× magnification of the microstructure of an oxidation reaction product corresponding to Sample I, which has been modified by adding to the parent metal of FIG. 2, 5 weight percent W, FIG. 9A being a photomicrograph taken parallel to the growth direction (i.e., growth of the alloy occurred in a plane perpendicular to the plane of the page)

DESCRIPTION OF THE INVENTION AND PREFERRED EMBODIMENTS

In accordance with the present invention, a parent metal (e.g., aluminum), which typically is doped (as explained below in greater detail), and is the precursor to the oxidation reaction product, is formed into an ingot, billet, rod, plate, or the like; and is placed into a reaction setup of an inert bed, crucible or other refractory container. It has been discovered that employing a process modifier in conjunction with the parent metal effects an alteration of the microstructure of the resulting oxidation reaction product as compared with the microstructure of substantially the same oxidation reaction product produced in accordance with an unmodified, but otherwise substantially the same, process. The modifier comprises one or more metals or precursors thereof, preferably a transition metal. The preferred transition metals include those of the Groups I-B, IV-B, V-B, VI-B, VII-B and VIII of the Periodic Table of Elements.

A suitable quantity of one or more process modifiers is provided to the setup comprising parent metal, refractory containment vessel, and optionally a composite filler material or preform, by (1) pre process alloying of the modifier with the parent metal, or employing a commercially available alloy having a suitable quantity of modifier in its composition. (2) applying the modifier to, or contacting same with, one or more surfaces of the parent metal, or (3) in cases where a composite is formed, by admixing a suitable quantity of the modifier with the filler or preform material (which techniques are discussed in greater detail below) such that the modifier will be used in conjunction with the parent metal.

The ceramic body produced by the oxidation reaction of a molten parent metal with an oxygen gas as oxidant is characterized by a polycrystalline oxidation reaction product containing also one or more metallic constituents and/or porosity. Such a ceramic material with an altered microstructure (i.e. one in which one or more microstructural features, such as the morphology of the oxidation reaction product and/or residual metal, have been changed due to the addition of a process modifier) can be expected to show improvements in certain properties, especially certain mechanical properties, in relation to the unmodified material. For example, if the microstructure has been refined, (refinement of the microstructure as used herein in the specification and appended claims refers to a variation in the geometrical disposition of microstructural characteristics such as metal channel size, metal channel spacing, pore size and spacing, etc., between two ceramic bodies produced by the vapor-phase oxidation of a parent metal, with one body being the standard) various mechanical properties are effected. A refinement of a particular microstructural feature can be quantitated by conventional quantitative metallographic techniques as described below in the Example.

It has been discovered that the us of relatively small quantities of process modifiers with the parent metal produces a ceramic body having microstructural characteristics which are altered in relation to those of a ceramic body produced in accordance with an unmodified, but otherwise substantially the same, oxidation reaction process. For example, it has been discovered that additions in the range of 0.1-10 weight percent of one or more transition metals, or a precursor thereof, such as copper, nickel, tungsten, niobium, zirconium, iron, chromium, titanium, and cobalt to an aluminum parent metal effects an alteration of the microstructure of the resulting aluminum oxide ceramic body as compared with the microstructure of a ceramic body produced without the use of a modifier. It should be understood that the term "conjunction" or similar terms as used herein and as in the appended claims means alloying or contacting the modifier with a parent metal and otherwise situating the modifier (e.g. adding to the filler) such that it will be contacted by, or become alloyed with, the parent metal during formation of the oxidation reaction product.

As explained above, in accordance with the present invention, a suitable quantity of a modifier may be provided by alloying it with the parent metal prior to the fabrication process For example, in a system using an aluminum parent metal and air as the vapor-phase oxidant to form an alumina oxidation reaction product, modifiers such as titanium, tungsten, copper, nickel, iron, cobalt, zirconium, niobium, chromium or other transition metals may be alloyed in with the aluminum parent metal. It may be desirable, for example, to employ copper as a process modifier, due to the ready commercial availability of copper containing aluminum alloys. A suitable quantity of copper metal is typically in the range of 0.25-10 weight percent based on the aluminum parent metal. The alloy of aluminum parent metal and copper modifier metal is heated below the melting point of the intended oxidation reaction product, alumina, but above the melting point of the aluminum-copper alloy (as described in above-referenced Commonly Owned Patents and Patent Applications). When the molten aluminum precursor metal is contacted with the oxidant in the appropriate temperature range, there is formed a layer of oxidation reaction product, which is permeable to the molten metal. In certain cases, when magnesium is employed as a dopant for the aluminum parent metal (discussed below in greater detail), there may be an initial layer of magnesium aluminate spinel which will precede the formation of the alumina oxidation reaction product. In any case, molten alloy is transported through the formed oxidation reaction product, towards the oxidant. As the molten alloy contacts the oxidant, the aluminum metal constituent of the alloy is at least partially oxidized, thus forming a progressively thicker layer of oxidation reaction produc The modifier metal, also being a constituent of the molten alloy, is likewise transported into the formed oxidation reaction product. However, the copper modifier metal, e.g. copper, is not depleted from the molten metal by oxidation because the free energy of formation of its oxide is less negative than that of aluminum oxide. Thus, the relative concentration of the modifier may increase as the aluminum is oxidized and depleted from the molten alloy The oxidation of the aluminum metal is continued for a time sufficient for the formation of the desired amount of oxidation reaction product. In the presence of a modifier addition, the resulting ceramic is found to have an altered microstructure.

Where the desired quantity of modifier metal is applied, as in layering, or contacted with one or more surfaces of an aluminum parent metal, and the parent metal is reacted with air as the vapor-phase oxidant, suitable modifier metals, for example, cobalt, zirconium, nickel, tungsten, titanium, niobium, iron, copper, or chromium, preferably in powder or particulate form are dispersed over, or contacted with, one or more surfaces of the parent metal. For example, nickel may be a desirable modifier in the fabrication of a ceramic product in accordance with the present invention. Therefore, a suitable quantity of nickel powder, typically in the range of 0.5-10 percent of the weight of the aluminum parent metal, is dispersed over the growth surface of the aluminum parent metal body. As the molten aluminum metal precursor contacts the nickel metal, an amount of the nickel metal is conjoined with the molten aluminum metal. The molten metal is then transported into the alumina oxidation reaction product. The resulting oxidation reaction product exhibits an altered microstructure.

Where the product is a ceramic composite, fabricated by growing the oxidation reaction product into a mass of filler material, or a permeable preform, placed adjacent to the aluminum parent metal, the modifier metal may be alloyed with the parent metal, or it may be provided by admixing with the filler material or preform material, or applied, as in layering, to one or more surfaces of same. Where it is desirable to alter the entire microstructure of a ceramic body, care should be taken to ensure that at least a portion of the admixed modifier is in contact with the parent metal body. For example, if the desired composite product comprises an alumina ceramic matrix, fabricated by the vapor-phase oxidation of aluminum parent metal infiltrating a bed of silicon carbide particles, which may be preformed into a green body, powders or particles of a modifier such as titanium, iron, nickel, copper, chromium, etc., can be admixed with the silicon carbide filler material. For example, it may be desirable to employ nickel as a modifier to alter the microstructure of the ceramic body. Therefore, a suitable quantity of metal is admixed with the silicon carbide filler material. A suitable quantity of metal, in particulate form, is from about 0.1 to 10 grams of nickel per 100 grams of aluminum parent metal. As the formed alumina oxidation reaction product embeds the silicon carbide particles, and the molten aluminum is transported therethrough, the molten aluminum metal contacts and dissolves the admixed nickel metal. A quantity of modifier is thus conjoined with the molten parent metal. In some cases, a portion of modifier which is not conjoined with the molten parent metal, but is included in that portion of the mass of filler or preform which is infiltrated by the oxidation reaction product, may be present in the composite body as isolated inclusions of modifier. The modifier metal may also be applied only on one or more surfaces of a mass of filler or shaped preform For example, nickel powder may be applied as a layer onto a surface of a silicon carbide bed or preform. As the molten aluminum precursor metal contacts this surface, a quantity of nickel metal is conjoined therewith. Application of a modifier to one or more external surfaces of a mass of filler or preform in accordance with the present embodiment results in a composite body having an external layer comprising a ceramic with an altered microstructure.

In the practice of the present invention wherein the modifier metal is provided external to the parent metal, the modifier can be provided in the form of a mixture or compound which will react with the molten metal and/or dissociate under process conditions, to liberate the modifier metal which is then conjoined with the parent metal. Such a compound may be a metal oxide which is reducible by, or will react with the parent metal to liberate the modifier metal. For example, if a ceramic composite body is desired comprising an alumina ceramic matrix fabricated by the oxidation of aluminum parent metal and embedding particles of alumina filler material, an oxide of a desired modifier metal such as nickel, iron, or chromium may be admixed with the alumina bedding material, or layered on top of the aluminum parent metal. For example, chromium metal can be employed as a modifier metal by admixing chrome oxide with a bedding material. When the molten aluminum contacts the chrome oxide, the molten aluminum will reduce the chrome oxide and liberate chromium metal. A quantity of the liberated chromium metal is then conjoined with the molten aluminum, as discussed above.

As explained in the Commonly Owned Patent Applications and Patent, dopant materials, used in conjunction with the parent metal, favorably influence the oxidation reaction process. Therefore, it is beneficial to use one or more dopant materials in addition to the modifier. It should be noted, however, that when employing a dopant material in addition to a modifier metal, the presence of each may affect the function and/or performance of the other. Thus, in practicing the present invention wherein a dopant is employed, the respective concentrations of modifier metal and dopant necessary to effect the desired result of each may vary. Therefore, care should be taken to consider the effect of all metals present in a specific case when designing a system. The dopant or dopants used in conjunction or in association with the parent metal, as in the case of modifier metals, (1) may be provided as alloying constituents of the parent metal, (2) may be applied to at least a portion of the surface of the parent metal, or (3) may be applied to or incorporated into part or all of the filler material or preform, or any combination of two or more techniques (1), (2), or (3) may be employed. For example, an alloyed dopant may be used solely or in combination with a second externally applied dopant in the case of technique (3), wherein additional dopant or dopants are applied to the filler material, the application may be accomplished in any suitable manner as explained in the Commonly Owned Patent and Patent Applications.

The function or functions of a particular dopant material can depend upon a number of factors. Such factors include, for example, the particular combination of dopants when two or more dopants are used, the use of an externally applied dopant in combination with a dopant alloyed with the precursor metal, the concentration of dopant employed, the oxidizing environment, process conditions, and as stated above, the identity and concentration of the modifier metal present.

Dopants useful for an aluminum parent metal, with air as the oxidant, include magnesium, zinc, and silicon, especially when used in combination with each other or in combination with other dopants, as described below. These metals, or a suitable source of the metals, may be alloyed into the aluminum-based parent metal at concentrations for each of between about 0,1–10% by weight based on the total weight of the resulting doped metal. These dopant materials or a suitable source thereof (e.g. MgO, ZnO, or $SiO_2$) may also be used externally to the parent metal. Thus an alumina ceramic structure is achievable for an aluminum-silicon alloy parent metal using air as the oxidant by using MgO as an external dopant in an amount greater than about 0.0008 gram per gram of parent metal to be oxidized and greater than 0.003 gram per square centimeter of parent metal upon which the MgO is applied. However, the concentration of dopant needed, as discussed above, may depend upon the identity, presence, and concentration of a modifier metal.

Additional examples of dopant materials for aluminum parent metal include sodium, germanium, tin, lead, lithium, calcium, boron, phosphorus, and yttrium which may be used individually or in combination with one or more other dopants depending on the oxidant, identity and quantity of modifier metal present and process conditions. Rare earth elements such as cerium, lanthanum, praseodymium, neodymium, and samarium are also useful dopants, and herein again especially when used in combination with other dopants. All of the dopant materials, as explained in the Commonly Owned Patent and Patent Applications, are effective in promoting polycrystalline oxidation reaction product growth for the aluminum-based parent metal systems.

A barrier means may be used to inhibit growth or development of the oxidation reaction product beyond the barrier. Suitable barrier means may be any material, compound, element, composition, or the like, which, under the process conditions of this invention, maintains some integrity, is not volatile, and preferably is permeable to the vapor-phase oxidant white being capable of locally inhibiting, poisoning, stopping, interfering with, preventing, or the like, continued growth of oxidation reaction product. Suitable barriers include calcium sulfate (Plaster of Parts), calcium silicate, Portland cement, and combinations thereof, which typically are applied as a slurry or paste to the surface of the fitter material or preform. These barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the fitter bed or preform is especially desirable. For example, if the preform comprises alumina and the resulting ceramic comprises alumina, the barrier may be admixed with alumina particulate, desirably having a mesh size of about 20–1000. Other suitable barriers include refractory ceramics or metal sheaths, which are open on at least one end to permit the vapor-phase oxidant to permeate the bed and control the molten parent metal. In certain cases, it may be possible to supply a source of modifier metal with the barrier means. For example, certain stainless steel compositions, when reacted under certain oxidizing process conditions as at a high temperature n an oxygen-containing atmosphere, form their component oxides such as iron oxide, nickel oxide, or chromium oxide depending on the composition of the stainless steel. Thus, in some cases, a barrier means such as a stainless steel sheath has been found to provide a suitable source of modifier metal on contact with the molten parent metal. This may effect refinement in microstructure at the periphery of the ceramic body.

EXAMPLE

In accordance with the present invention, several process modifiers were separately added to two different separate aluminum alloys one containing 3 weight percent Si/3 weight percent Mg and one containing 5 weight percent Si/3 weight percent Mg. These materials were employed to fabricate ceramic structures by the vapor-phase oxidation of molten parent metal as disclosed in the aforesaid Commonly Owned Patent Applications and Patent. Additionally, for comparison purposes ceramic structures were grown under identical conditions employing the 3 St/3 Mg and the 5 St/3 Mg alloys without the addition of a process modifier.

The modified alloy bars and the two control bars measuring $4\frac{1}{2}''\times 2''\times\frac{1}{2}''$, were placed into separate beds of alumina particles (Norton E1 Alundum, 90 mesh particle size), which were contained in refractory vessels, such that one $4\frac{1}{2}''\times 2''$ face of the bar was substantially flush with the bed and exposed to the atmosphere. A thin layer of dopant material, $-140$ mesh $SiO_2$, was uniformly dispersed over the exposed surface of each bar (approximately 0.01 to 0.04 gram $SiO_2/cm^2$). Each of these setups was placed into a furnace, and heated up over 5 hours to 1250° C. The furnace was held at 1250° C. for 20 hours, and cooled down to ambient over 5 hours. Each setup was removed, and the resulting ceramic bodes were recovered.

Figure 1A:
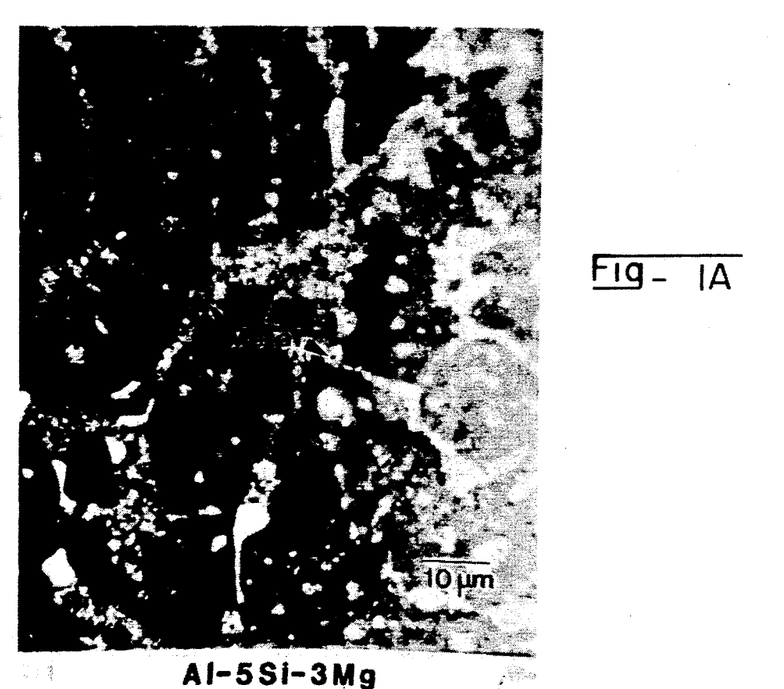
Figure 1B:
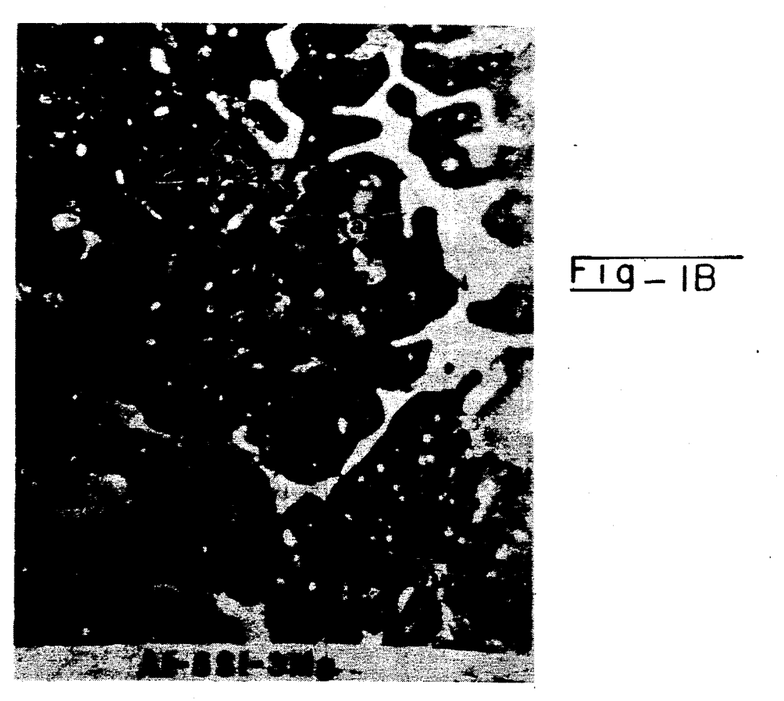
FIG. 1B is a photomicrograph of a microstructure taken perpendicular to the growth direction of the oxidation reaction product (i.e., growth occurred within the plane of the page).
Figure 2A:
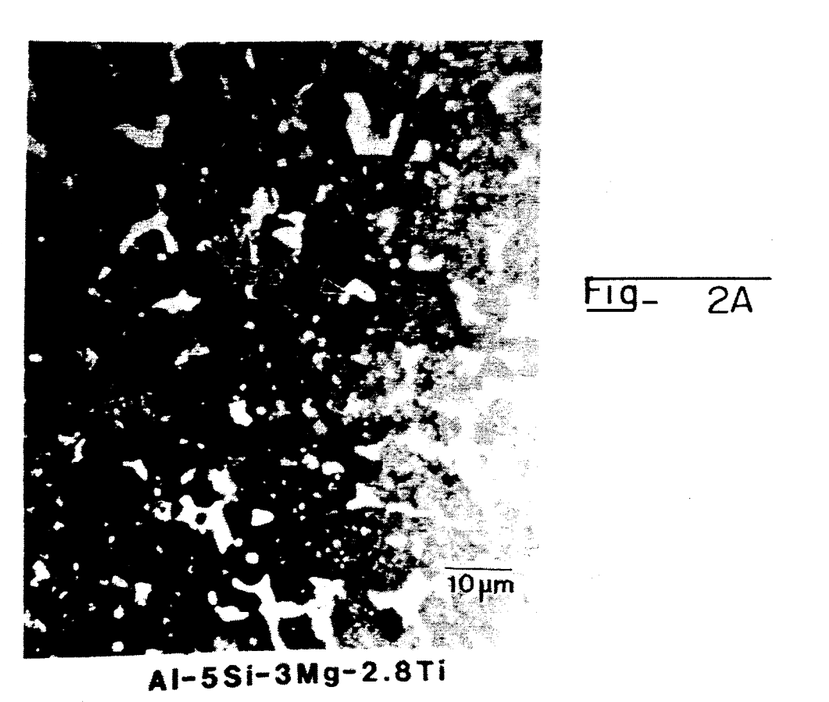
Figure 2B:
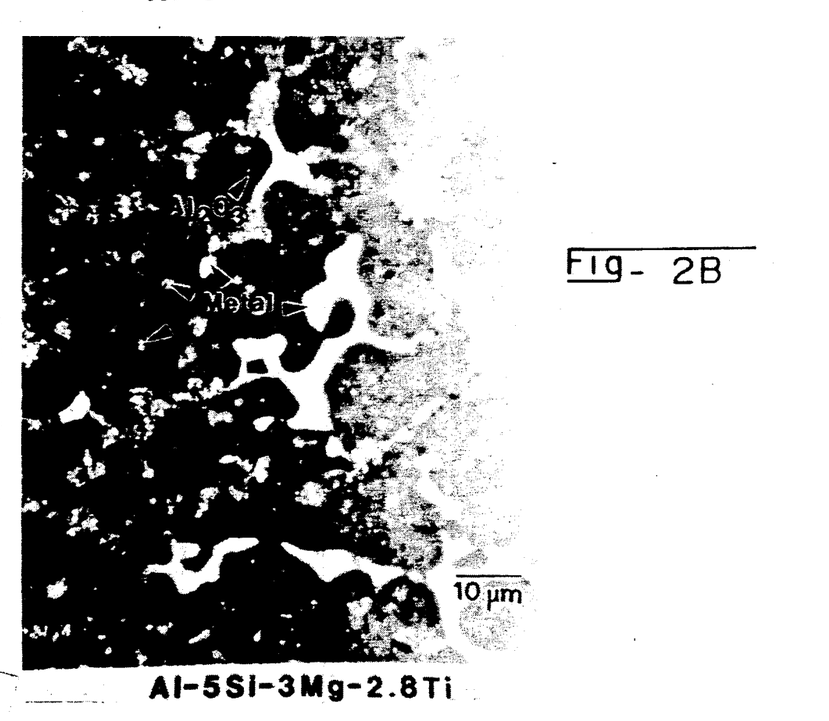
FIG. 2B is a photomicrograph of a microstructure taken perpendicular to the growth direction of the oxidation reaction product (i.e., growth occurred within the plane of the page).
Figure 3A:
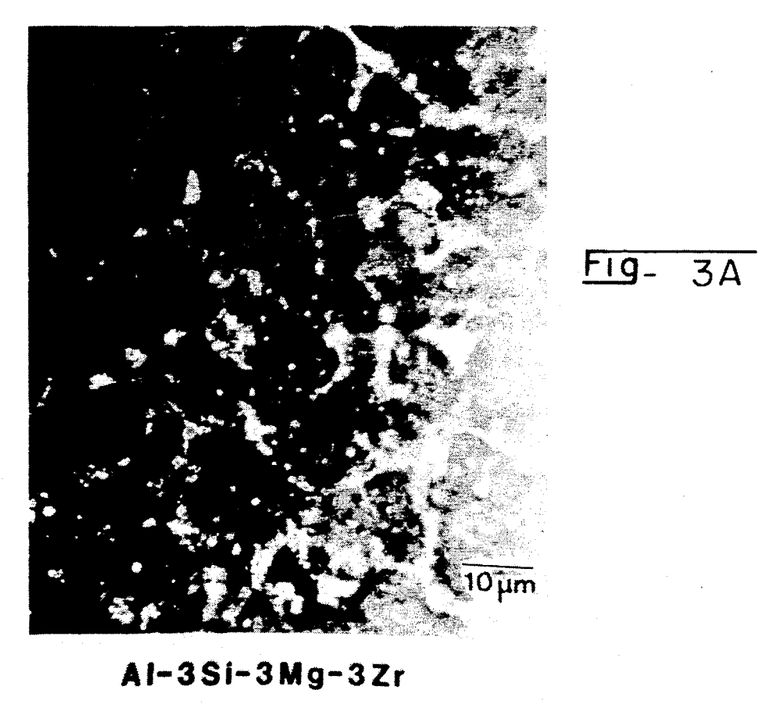
Figure 3B:
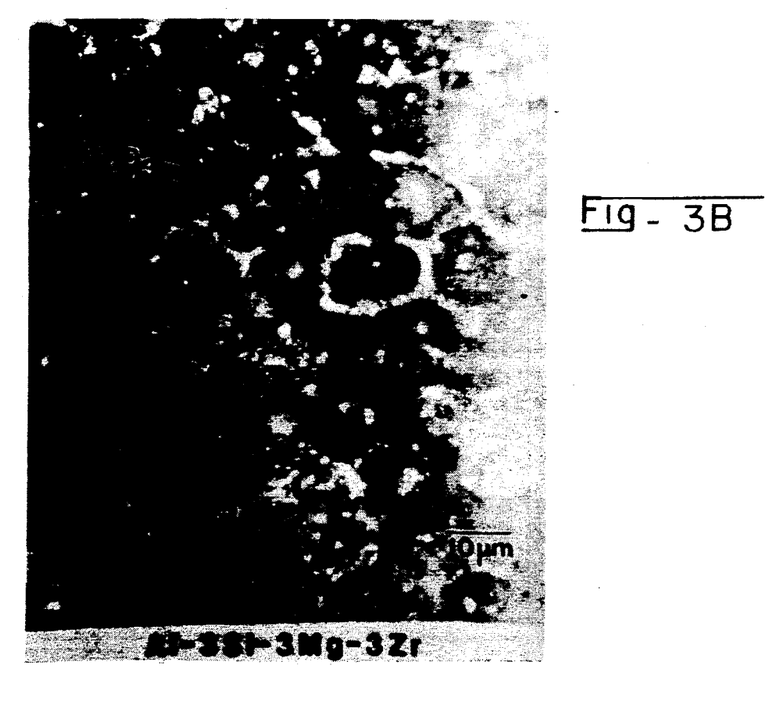
FIG. 3B is a photomicrograph of a microstructure taken perpendicular to the growth direction of the oxidation reaction product (i.e., growth occurred within the plane of the page).
Figure 4A:
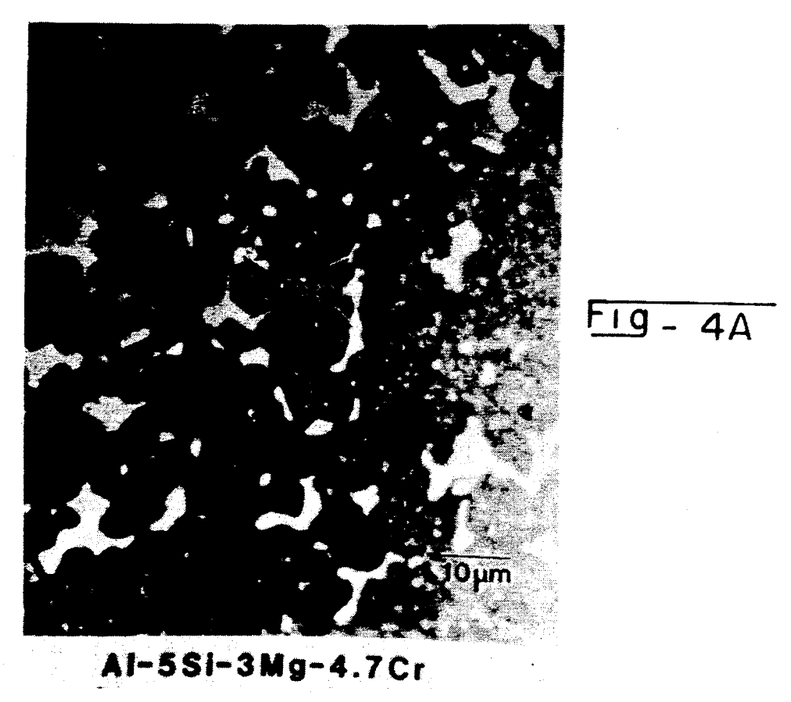
Figure 4B:
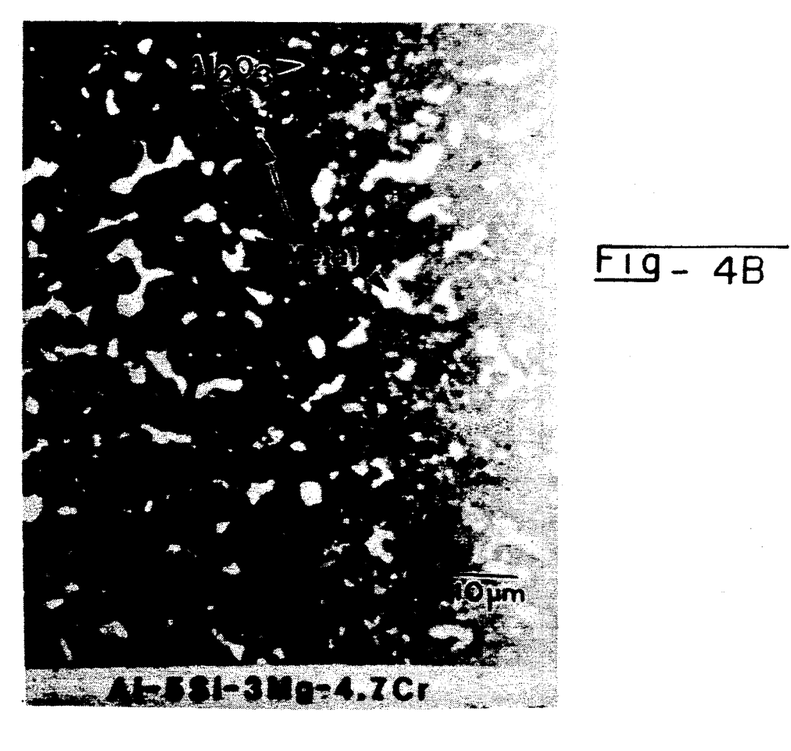
FIG. 4B is a photomicrograph of a microstructure taken perpendicular to the growth direction of the oxidation reaction product (i.e., growth occurred within the plane of the page).
Figure 5A:
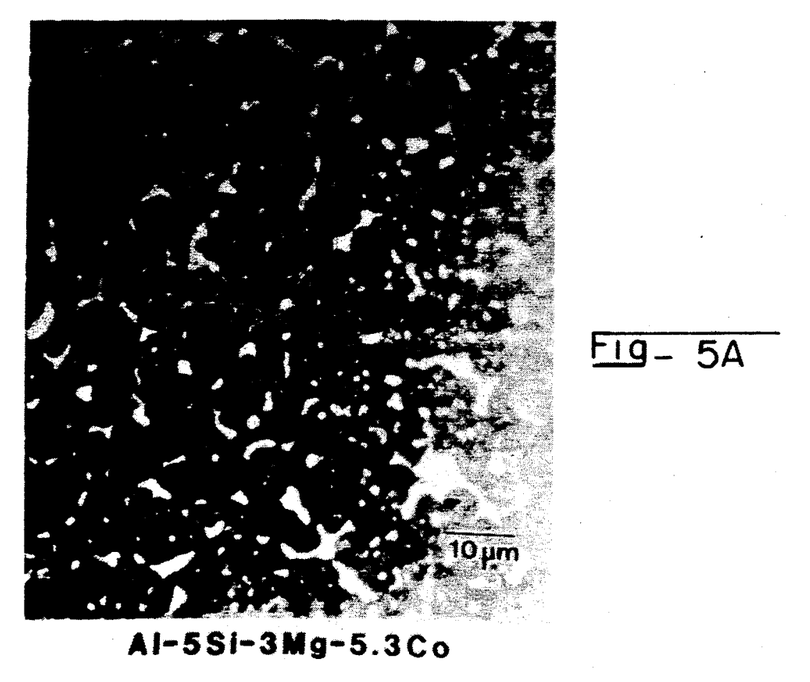
Figure 5B:
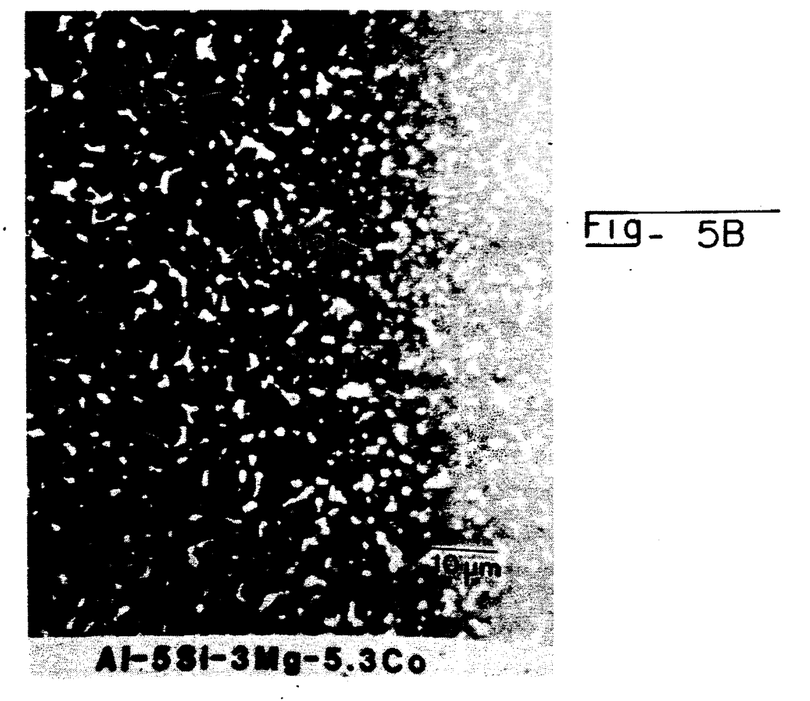
FIG. 5B is a photomicrograph of a microstructure taken perpendicular to the growth direction of the oxidation reaction product (i.e., growth occurred within the plane of the page).
Figure 6A:
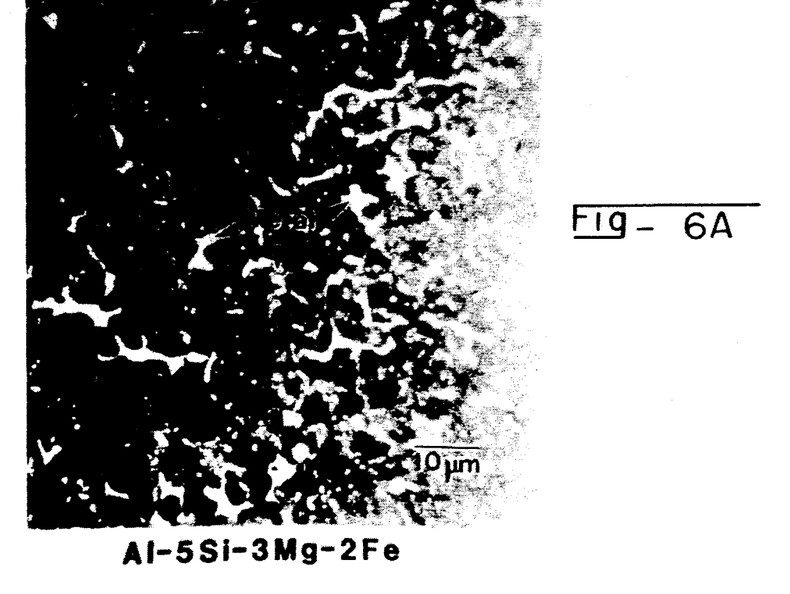
Figure 6B:
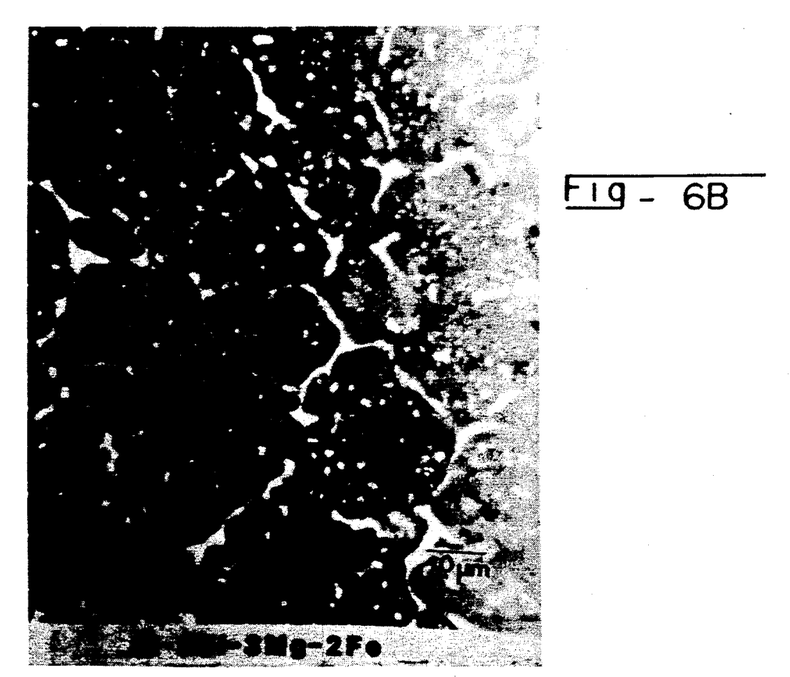
FIG. 6B is a photomicrograph of a microstructure taken perpendicular to the growth direction of the oxidation reaction product (i.e., growth occurred within the plane of the page).
Figure 7A:
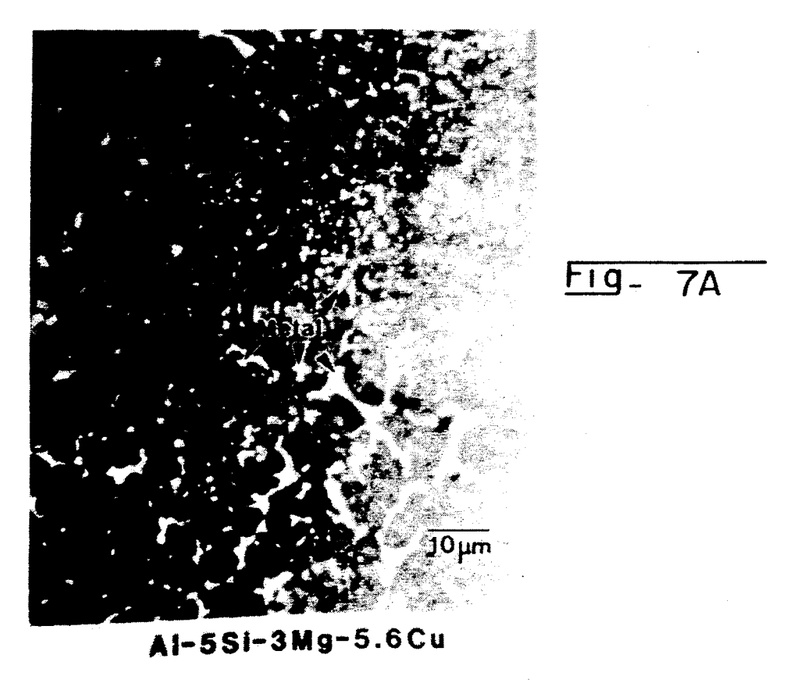
Figure 7B:
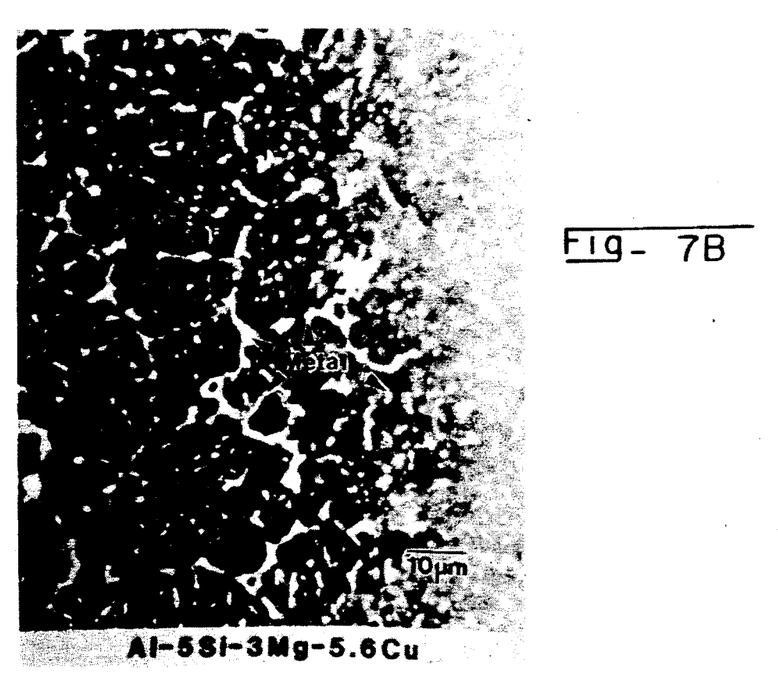
FIG. 7B is a photomicrograph of a microstructure taken perpendicular to the growth direction of the oxidation reaction product (i.e., growth occurred within the plane of the page).
Figure 8A:
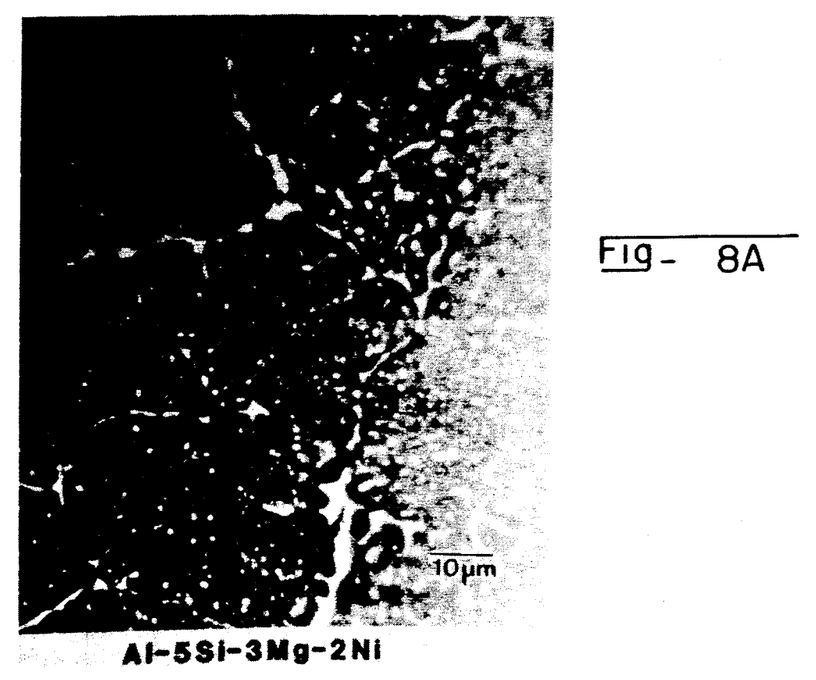
Figure 8B:
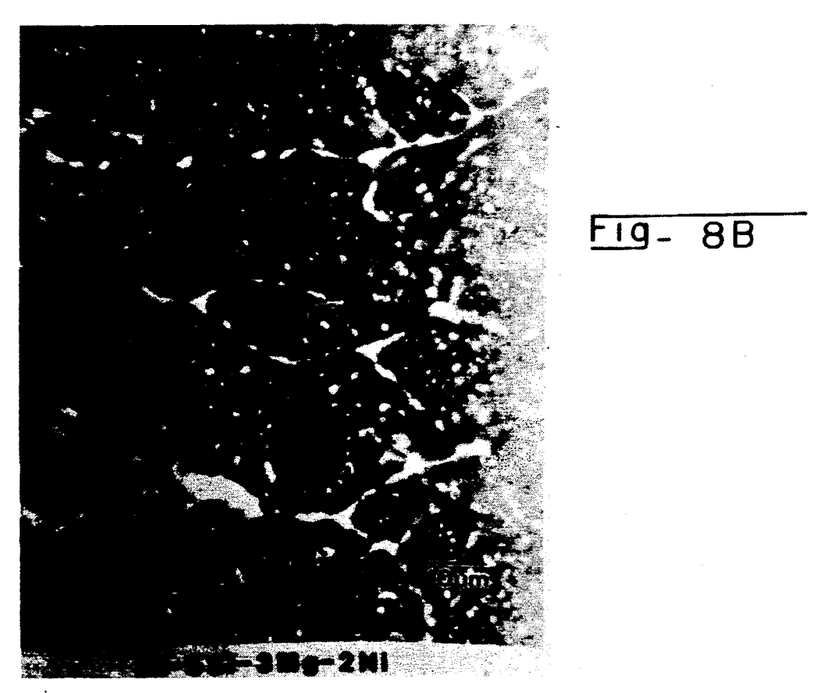
FIG. 8B is a photomicrograph of a microstructure taken perpendicular to the growth direction of the oxidation reaction product (i.e., growth occurred within the plane of the page).
Figure 9A:
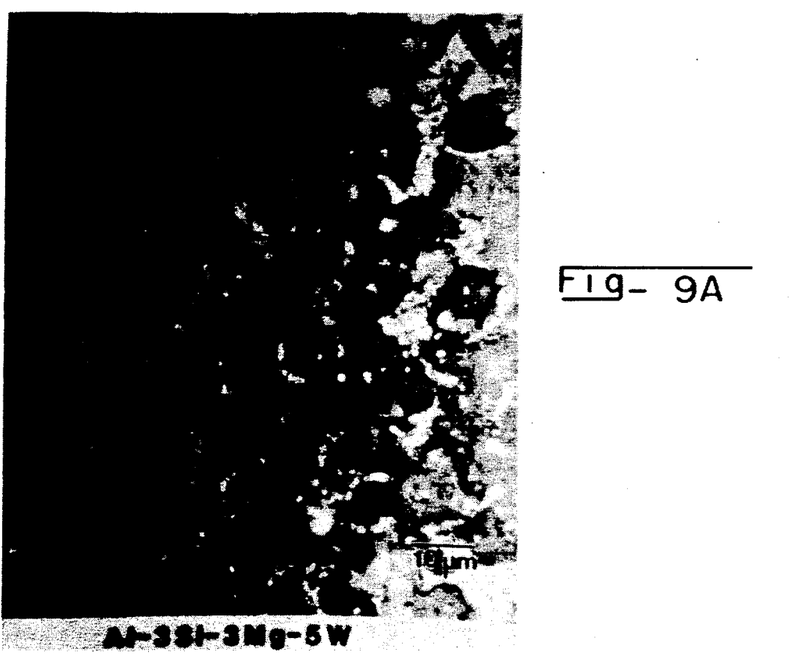
Figure 9B:
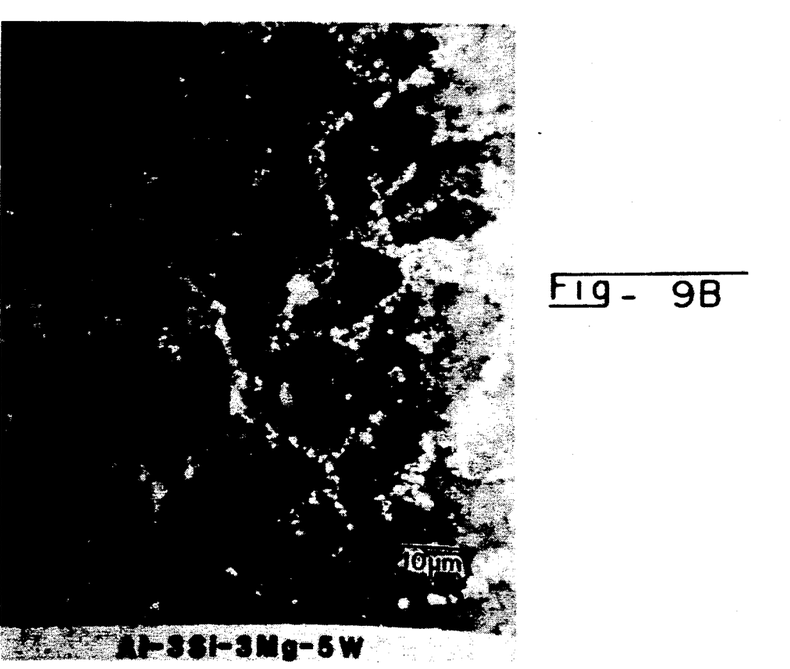
FIG. 9B is a photomicrograph of a microstructure taken perpendicular to the growth direction of the oxidation reaction product (i.e., growth occurred within the plane of the page).

Cross-sections were prepared from each of samples A-L of the produced ceramic bodies, and two photomicrographs were taken from each microstructure in samples A-I at a magnification of about 1000×. Particularly, a first photomicrograph (e.g., FIGS. 1A, 2A, 3A, 4A, 5A, 6A, 7A, 8A and 9A) was taken parallel to the growth direction (i.e., growth of the ceramic body was perpendicular to the plane of the paper) and a second photomicrograph (e.g., FIGS. 1B, 2B,3B, 4B, 5B, 6B, 7B, 8B and 9B) was taken perpendicular to the growth direction (i.e., growth of the ceramic body was within the plane of the paper) for each of samples A-I. The microstructures of those ceramic materials fabricated with the use of a process modifier shared an altering of the microstructure as compared Sample A (e.g., to the control sample). One method of quantifying the alteration in microstructure is by use of the average lineal intercept method. In this technique, the average size of a given constituent in a microstructure is represented by the average length of the intercepts of that constituent with a series of random lines overlaid on a photomicrograph obtained at a fixed magnification. In the present case the microstructural constituent selected for measurement was the passages through the oxidation reaction product as represented in the photomicrograph by non oxidized metal and/or void regions. The results of these measurements are given n Table 1 below. However, it is clear from each of FIGS. 1–9 that the process modifiers cause morphological changes in the microstructure of Samples B-I, relative to the standard shown in Sample A. For example, it appears that aspect ratios of the alumina and the metal in each of the photomicrographs B-I varies relative to the aspect ratios in Sample A, due to the addition of process modifiers

TABLE I

| Sample No | Aluminum Base Alloy (wt. %) | Modifier | (Wt. %) | Average Intercept Length (um) as Viewed in Growth Direction | Average Intercept Length (um) as Viewed Perpendicular to Growth Direction | Volume Percent Ceramic |
|---|---|---|---|---|---|---|
| A | 3 Mg, 5 Si | (None) |  | 3.7 | 4.6 | 74.8 |
| B | 3 Mg, 5 Si | Titanium | 2.8 | 2.5 | 1.8 | 84.9 |
| C | 3 Mg, 3 Si | Zirconium | 3.0 | 2.3 | 2.9 | 81.2 |
| D | 3 Mg, 5 Si | Chromium | 4.7 | 2.7 | 1.7 | 83.2 |
| E | 3 Mg, 5 Si | Cobalt | 5.3 | 1.2 | 1.1 | 86.1 |
| F | 3 Mg, 5 Si | Iron | 2.0 | 1.6 | 1.4 | 86.0 |
| G | 3 Mg, 5 Si | Copper | 5.6 | 1.4 | 1.0 | 76.4 |
| H | 3 Mg, 5 Si | Nickel | 2.0 | 1.1 | 0.8 | 81.1 |
| I | 3 Mg, 3 Si | Tungsten | 5.0 | 2.9 | 3.5 | 82.8 |
| J | 3 Mg, 5 Si | Iron | 0.3 | N/M | 1.2 | 87.5 |
| K | 3 Mg, 3 Si | Niobium | 3.0 | N/M | N/M | 86.0 |
| L | 3 Mg, 5 Si | Nickel | 4.0 | N/M | N/M | 78.3 |

*N/M = Not Measured

Since small values of the average lineal intercepts are indicative of a reduction in size of the microstructural features, the results in Table 1 clearly show that the size of the passages in the oxidation reaction product has been reduced, in some oases quite drastically, by the presence of the modifier.

Mechanical properties data also demonstrate the effects of the modifier. For example, the ceramic product of the oxidation reaction of an alloy containing 3 weight percent nickel and 5 weight percent silicon was found to have a macrohardness of 73 on the Rockwell A scale. Materials prepared using 2 weight percent and 4 weight percent of a nickel modifier showed increased hardness of 78 and 82, respectively, on the same hardness scale.

What is claimed is:

1. A method for producing a self-supporting ceramic body comprising (1) a ceramic matrix obtained by oxidation of a parent metal comprising a primary chemical constituent to form a polycrystalline material comprising an oxidation reaction product which is the product of reaction of said parent metal with an oxidant; and (2) a metallic constituent, said method comprising:

(a) conjoining said parent metal with at least one dopant comprising at least one primary chemical constituent;

(b) conjoining said parent metal and said dopant with at least one process modifier, said at least one process modifier comprising at least one material selected from the group consisting of copper, silver, gold, titanium, zirconium, hafnium, manganese, iron, cobalt, nickel, platinum, vanadium, niobium, tantalum, chromium, molybdenum, tungsten, technetium, rhenium, rubidium, osmium, rhodium, iridium, and palladium, and said at least one process modifier being present in an amount greater than 0.1% and less than 2% by weight of said parent metal when the formation of said oxidation reaction product is begun, said at least one process modifier having a composition wherein a primary chemical constituent therein is different from said primary chemical constituent of said parent metal and said at least one primary chemical constituent in said at least one dopant;

(c) heating said parent metal in the presence of an oxidant to a temperature above its melting point but below the melting point of said oxidation reaction product to form a body of molten metal and at said temperature reacting said molten metal with said oxidant to form an oxidation reaction product, which product is in contact with and extends between said body of molten metal and said oxidant, and at said temperature transporting said molten metal through said oxidation reaction product towards said oxidant so that fresh oxidation reaction product continues to form at an interface between said oxidant and previously formed oxidation reaction product, thereby growing a progressively thicker body of said oxidation reaction product and continuing said reaction for a time sufficient to produce said ceramic body; and (d) recovering said ceramic body, wherein said ceramic body is characterized by an altered microstructure relative to substantially the same oxidation reaction product produced without a process modifier.

2. A method for producing a self-supporting ceramic body comprising (1) a ceramic matrix obtained by oxidation of an aluminum parent metal comprising an aluminum primary chemical constituent to form a polycrystalline material comprising an oxidation reaction product of said aluminum parent metal with an oxidant; and (2) a metallic constituent, said method comprising:

(a) conjoining said aluminum parent metal with at least one dopant comprising at least one primary chemical constituent;

(b) conjoining said aluminum parent metal and said dopant with at least one process modifier, said at least one process modifier comprising at least one material selected from the group consisting of copper, silver, gold, titanium, zirconium, hafnium, manganese, iron, cobalt, nickel, platinum, vanadium, niobium, tantalum, chromium, molybdenum, tungsten, technetium, rhenium, rubidium, osmium, rhodium, iridium, and palladium, and said at least one process modifier being present in an amount greater than 0.1% and less than 2% by weight of said parent metal when the formation of said oxidation reaction product is begun, said at least one process modifier having a composition wherein a primary chemical constituent therein is different than said primary chemical constituent of said aluminum parent metal and said at least one primary chemical constituent in said at least one dopant;

(c) heating said aluminum parent metal in the presence of an oxidant to a temperature above its melting point but below the melting point of said oxidation reaction product to form a body of molten metal and at said temperature reacting said molten metal with said oxidant to form said oxidation reaction product, which product is in contact with and extends between said body of molten metal and said oxidant, and at said temperature transporting said molten metal through said oxidation reaction product towards an oxidant so that fresh oxidation reaction product continues to form at an interface between said oxidant and previously formed oxidation reaction product, thereby growing a progressively thicker body of said oxidation reaction product and continuing said reaction for a time sufficient to produce said ceramic body; and (d) recovering said ceramic body, wherein said ceramic body is characterized by an altered microstructure relative to substantially the same oxidation reaction product produced without a process modifier.

3. A method for producing a self-supporting ceramic composite body comprising (1) a ceramic matrix obtained of a parent metal comprising a primary chemical constituent to form a polycrystalline material comprising an oxidation reaction product which is the product of reaction of said parent metal, with an oxidant; and (2) a mass of filler material, said method comprising:

(a) conjoining said parent metal with at least one dopant comprising at least one primary chemical constituent;

(b) conjoining said parent metal and said dopant with at least one process modifier, said at least one process modifier comprising at least one material selected from the group consisting of copper, silver, gold, titanium, zirconium, hafnium, manganese, iron, cobalt, nickel, platinum, vanadium, niobium, tantalum, chromium, molybdenum, tungsten, technetium, rhenium, rubidium, osmium, rhodium, iridium, and palladium, and said at least one process modifier being present in an amount greater than 0.1% and less than 2% by weight of said parent metal when the formation of said oxidation reaction product is begun, said at least one process modifier having a composition wherein a primary chemical constituent therein is different than said primary chemical constituent of said parent metal and said at least one primary chemical constituent in said at least one dopant;

(c) providing at least one material to be embedded, comprising said mass of filler material, said at least one material to be embedded being placed adjacent to said parent metal;

(d) heating said parent metal in the presence of said oxidant to a temperature above its melting point but below the melting point of said oxidation reaction product to form a body of molten metal and at said temperature reacting said molten metal with said oxidant to form said oxidation reaction product, which product is in contact with and extends between said body of molten metal and said oxidant, and at said temperature transporting said molten metal through said oxidation reaction product towards an oxidant so that fresh oxidation reaction product continues to form at an interface between said oxidant and previously formed oxidation reaction product, thereby growing a progressively thicker body of said oxidation reaction product, and thereby embedding at least a portion of said at least one material to be embedded, and continuing said reaction for a time sufficient to produce said ceramic composite body; and (e) recovering said ceramic composite body, wherein said ceramic composite body is characterized by an altered microstructure relative to substantially the same oxidation reaction product produced without a process modifier.

4. The method of claim 1, wherein said process modifier is alloyed with said parent metal prior to said heating step.

5. The method of claim 1, wherein said process modifier is applied to at least one surface of said parent metal.

6. The method of claim 1, wherein said oxidant comprises air.

7. The method of claim 2, wherein said process modifier is alloyed with said aluminum parent metal prior to said heating step.

8. The method of claim 2, wherein said process modifier is applied to at least one surface of said aluminum parent metal.

9. The method of claim 2, wherein said oxidant comprises air.

10. The method of claim 3, wherein said process modifier is admixed with said filler material.

11. The method of claim 3, wherein said oxidant comprises air.

12. The method of claim 1, wherein said at least one dopant comprises at least one material selected from the group consisting of magnesium, tin, silicon, zinc, germanium, lead, sodium, lithium, calcium, boron, phosphorus, yttrium, cerium, lanthanum, praseodymium, neodymium, and samarium.

13. The method of claim 2, wherein said at least one dopant comprises at least one material selected from the group consisting of magnesium, tin, silicon, zinc, germanium, lead, sodium, lithium, calcium, boron, phosphorus, yttrium, cerium, lanthanum, praseodymium, neodymium, and samarium.

14. The method of claim 3, wherein said at least one dopant comprises at least one material selected from the group consisting of magnesium, tin, silicon, zinc, germanium, lead, sodium, lithium, calcium, boron, phosphorus, yttrium, cerium, lanthanum, praseodymium, neodymium, and samarium.

15. The method of claim 1, wherein said altered microstructure comprises a refined microstructure.

16. The method of claim 2, wherein said altered microstructure comprises a refined microstructure.

17. The method of claim 3, wherein said altered microstructure comprises a refined microstructure.

18. The method of claim 3, wherein said mass of filler material comprises a shaped preform.

* * * * *